(No Model.)
M. SPIELDIENER.
SALT SPRINKLER.
No. 548,727. Patented Oct. 29, 1895.
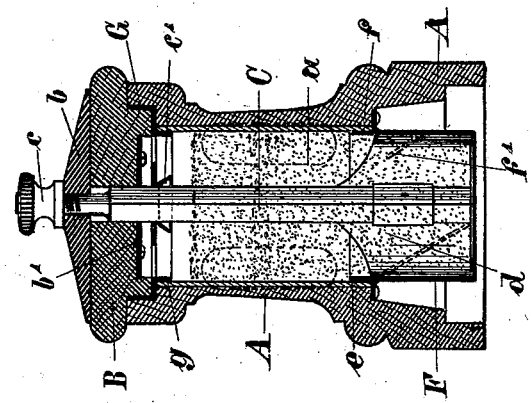
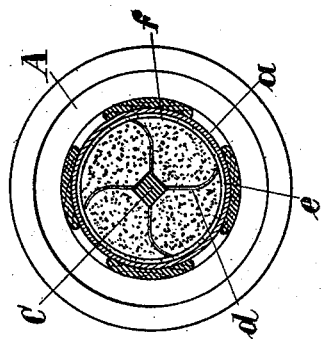
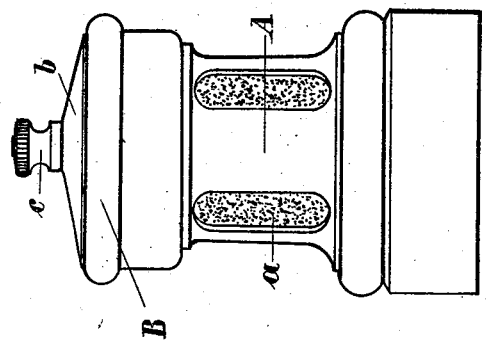
Witnesses:
M. C. Massie
A. J. Birny
Inventor:
Max Spieldiener
by Max Georgii
his attorney.

UNITED STATES PATENT OFFICE.

MAX SPIELDIENER, OF STUTTGART, GERMANY, ASSIGNOR TO A. B. DRAUTZ, OF SAME PLACE.

SALT-SPRINKLER.

SPECIFICATION forming part of Letters Patent No. 548,727, dated October 29, 1895.

Application filed September 20, 1894. Serial No. 523,584. (No model.)

*To all whom it may concern:*

Be it known that I, MAX SPIELDIENER, agent for machinery, of Charlottenstrasse 6, Stuttgart, Germany, have invented a new and useful Improved Salt-Sprinkling Vessel for Household, Hotel, or Like Purposes, of which the following is a specification.

My invention relates to an invention in condiment-holders, and particularly to a device for holding and distributing salt.

The object of my invention is to produce a vessel in which one element performs the threefold function of agitating or pulverizing the salt, forcing it out through the perforations, and keeping said perforations clear.

My invention consists in the features, details of construction, and combinations of parts, which will first be described in connection with the accompanying drawings and then particularly pointed out in the claims.

In the drawings, Figure 1 is an elevation of a device embodying my invention. Fig. 2 is a vertical, and Fig. 3 a horizontal, section of the same.

A cylindrical or otherwise suitably-shaped receptacle F, open above and made of sheet metal or other suitable material, is inserted in a casing A, which is preferably made of wood. The vertical periphery at the lower part of the receptacle F has inclined or, if desired, otherwise shaped narrow slots $f'$. The lower part of the casing A is widened inside as far up as the slots $f'$ extend in order to render it possible for the salt forced out of these slots to escape from the casing A. An annular space or recess surrounding the openings in the vertical periphery of the receptacle is thus formed, the sides or walls of said recess forming a continuation of the casing A, which hides the slots or openings and serves as a base to support the entire device when not in use. Furthermore, the said sides or walls also act to some extent as a deflector to throw the salt downward, and thus prevent it being scattered over too large an area. The latter is closed at the top by a lid or cap B, which is revolubly retained on the casing A by means of a spindle C with screw $c$, but is not adjustable longitudinally on the same. On the lower stouter part of the spindle C, arranged opposite the slots or openings $f'$ and in contact with the interior surface of the receptacle, are vanes $d$, by means of which the salt is forced through the slots $f'$. A cross-piece G is fixed in the casing A between it and the lid B or is attached to the receptacle F. This cross-piece serves as a guide for the upper thin part of the spindle C, which is passed through it, while the thicker part presses against it, and thus the spindle and the wings are retained in their positions in the receptacle F. The cross-piece G is small enough to allow of salt being inserted in the receptacle F between the cross-piece and the side of the casing A after the lid or cap has been removed.

In using my device the casing A is grasped by one hand while the cap B is rotated with the other hand, thus turning the vanes $d$ within the receptacle, the vanes pulverizing the salt and forcing it outward through the slots, at the same time scraping the inner surface of the receptacle and thus preventing the clogging of the slots. Furthermore, the slots being inclined distribute the salt much better than if vertical.

Having thus fully described my invention, what I claim as new, and desire to secure by Letters Patent, is—

1. The combination, with a receptacle for salt and the like provided with openings in its vertical periphery and having a closed bottom, of a series of vanes revolubly mounted within the receptacle opposite the openings, substantially as set forth.

2. The combination, with a receptacle for salt and the like provided with inclined slots in its vertical periphery, of a spindle revolubly mounted in said receptacle and provided with vanes arranged opposite the slots and to contact with the interior surface of the receptacle, substantially as set forth.

3. The combination, with a receptacle for salt and the like provided with openings in its vertical periphery, of a series of revoluble vanes within the receptacle and arranged opposite the openings, and a casing surrounding the receptacle and provided with an annular recess surrounding the openings in the receptacle, substantially as set forth.

4. The combination, with a receptacle for salt and the like, provided with openings in its vertical periphery, and a revoluble spindle within the receptacle, of a series of vanes attached to the spindle and arranged to contact with the inner surface of the receptacle opposite the openings, and a cap revolubly mounted on the receptacle and attached to the spindle, substantially as described, and for the purpose set forth.

5. The combination, with a receptacle for salt and the like, provided with openings in its vertical periphery, a revoluble spindle within the receptacle, and a series of vanes attached to the spindle and arranged opposite the openings, of a casing surrounding the receptacle, and a cross-piece at the upper end of the casing through which the spindle passes, substantially as described, and for the purpose set forth.

6. The combination, with a receptacle for salt and the like, provided with openings in its vertical periphery, a revoluble spindle within the receptacle, and a series of vanes attached to the spindle opposite the openings, of a casing surrounding the receptacle, a cross-piece at the upper end of the casing through which the spindle passes, a revoluble cap secured to the upper end of the spindle, and a collar on the said spindle below the cross-piece, substantially as described, and for the purpose set forth.

In testimony whereof I have signed this specification in the presence of two subscribing witnesses.

MAX SPIELDIENER.

Witnesses:
　AUGUST B. DRAUTZ,
　WM. HAHN.